United States Patent
Yamada et al.

(10) Patent No.: US 8,092,565 B2
(45) Date of Patent: Jan. 10, 2012

(54) PARTICULATE FILTER

(75) Inventors: Hiroshi Yamada, Hiroshima (JP); Koichiro Harada, Higashihiroshima (JP); Kenji Suzuki, Komaki (JP); Kenji Okamoto, Hiroshima (JP); Akihide Takami, Hiroshima (JP)

(73) Assignee: Mazda Motor Corporation (JP)

( * ) Notice: Subject to any disclaimer, the term of this patent is extended or adjusted under 35 U.S.C. 154(b) by 444 days.

(21) Appl. No.: 12/396,117

(22) Filed: Mar. 2, 2009

(65) Prior Publication Data

US 2009/0241495 A1    Oct. 1, 2009

(30) Foreign Application Priority Data

Mar. 28, 2008 (JP) ................................. 2008-087196

(51) Int. Cl.
*B01D 46/00* (2006.01)

(52) U.S. Cl. ............. 55/483; 55/282.3; 55/484; 55/523; 55/DIG. 30; 422/177; 422/180; 428/116

(58) Field of Classification Search ................. 55/282.3, 55/483, 484, 523, DIG. 30; 422/177, 180; 428/116

See application file for complete search history.

(56) References Cited

U.S. PATENT DOCUMENTS

| | | | |
|---|---|---|---|
| 4,276,071 A | | 6/1981 | Outland |
| 4,364,761 A | | 12/1982 | Berg et al. |
| 4,417,908 A | | 11/1983 | Pitcher, Jr. |
| 6,669,751 B1 * | | 12/2003 | Ohno et al. ................ 55/523 |
| 6,696,132 B2 * | | 2/2004 | Beall et al. ................ 428/116 |
| 6,736,870 B2 * | | 5/2004 | Best et al. ................ 55/282.3 |
| 7,112,233 B2 * | | 9/2006 | Ohno et al. ................ 55/523 |
| 7,138,002 B2 * | | 11/2006 | Hamanaka et al. ............. 55/523 |
| 7,179,516 B2 * | | 2/2007 | Ichikawa ................ 428/116 |

(Continued)

FOREIGN PATENT DOCUMENTS

EP         1502639 A       2/2005

(Continued)

OTHER PUBLICATIONS

Extended European Search report dated Aug. 20, 2009; Application No. 09153569.0-2113.

*Primary Examiner* — Robert Clemente
(74) *Attorney, Agent, or Firm* — Studebaker & Brackett PC; Donald R. Studebaker

(57) ABSTRACT

Disclosed is a particulate filter 10, which comprises a filter body 8 including a plurality of filter segments F1, F2 joined to each other by a joining material 7, wherein each of the filter segments includes a plurality of inflow cells each having a closed end on a downstream side in an exhaust-gas flow direction, and a plurality of outflow cells each having a closed end on an upstream side in the exhaust-gas flow direction. The filter segments include a first filter segment located in a central region of the particulate filter and designed to form each of the inflow cells to have an opening area approximately equal to that of each of the outflow cells, and a second filer segment located in at least a part of an outer peripheral region of the particulate filter and designed to form each of the inflow cells to have an opening area greater than that of each of the outflow cells. The present invention can keep the central region of the particulate filter from becoming overheated during a particulate-filter regeneration process, while suppressing a pressure loss.

6 Claims, 8 Drawing Sheets

U.S. PATENT DOCUMENTS

| | | | |
|---|---|---|---|
| 7,238,217 B2 * | 7/2007 | Cutler et al. | 55/523 |
| 7,244,284 B2 * | 7/2007 | Miwa et al. | 55/523 |
| 7,247,184 B2 * | 7/2007 | Frost | 55/523 |
| 7,314,496 B2 * | 1/2008 | Hong et al. | 55/523 |
| 7,316,722 B2 * | 1/2008 | Komori et al. | 55/523 |
| 7,326,270 B2 * | 2/2008 | Hong et al. | 55/523 |
| 7,326,271 B2 * | 2/2008 | Kasai et al. | 55/523 |
| 7,384,441 B2 * | 6/2008 | Ito et al. | 55/523 |
| 7,393,377 B2 * | 7/2008 | Kasai et al. | 55/523 |
| 7,427,309 B2 * | 9/2008 | Ohno et al. | 55/523 |
| 7,517,502 B2 * | 4/2009 | Ohno et al. | 422/177 |
| 7,537,633 B2 * | 5/2009 | Bardon | 55/523 |
| 7,556,782 B2 * | 7/2009 | Ohno et al. | 422/180 |
| 7,585,471 B2 * | 9/2009 | Oshimi | 422/180 |
| 7,601,194 B2 * | 10/2009 | Beall et al. | 55/523 |
| 7,611,764 B2 * | 11/2009 | Komori et al. | 428/116 |
| 7,766,991 B2 * | 8/2010 | Komori et al. | 55/523 |
| 7,785,695 B2 * | 8/2010 | Ohno et al. | 428/116 |
| 2002/0020944 A1 | 2/2002 | Yamaguchi et al. | |
| 2004/0037754 A1 * | 2/2004 | van Setten et al. | 422/177 |
| 2004/0134173 A1 | 7/2004 | Bardon | |
| 2005/0102984 A1 * | 5/2005 | Bardon et al. | 55/484 |
| 2006/0118415 A1 | 6/2006 | Say et al. | |
| 2006/0168928 A1 | 8/2006 | Bardon | |
| 2006/0194018 A1 | 8/2006 | Ohno et al. | |
| 2007/0231535 A1 | 10/2007 | Mizutani | |
| 2009/0004073 A1 * | 1/2009 | Gleize et al. | 422/180 |

FOREIGN PATENT DOCUMENTS

| | | | |
|---|---|---|---|
| EP | 1538133 A | 6/2005 | |
| JP | 58092409 | 6/1983 | |
| JP | H04-231614 A | 8/1992 | |
| JP | 2004-524477 A | 8/2004 | |
| JP | 2007-260595 A | 10/2007 | |
| JP | 2007-262985 A | 10/2007 | |
| WO | 2007094499 A | 8/2007 | |
| WO | WO 2007088307 A2 * | 8/2007 | |

* cited by examiner

PARTICULATE FILTER

BACKGROUND OF THE INVENTION

1. Field of the Invention

The present invention relates to a particulate filter for trapping particulates contained in exhaust gas.

2. Description of the Related Art

In a vehicle equipped, for example, with a lean-burn gasoline engine or a diesel engine, carbon-containing particulates (hereinafter referred to as "particulates" or "particulate matter (PM)") are contained in exhaust gas discharged from the engine. Therefore, with a view to suppressing emissions of PM, a particulate filter is provided in an exhaust passage to trap PM thereon.

In such a vehicle provided with the particulate filter, an increase in PM trap amount (i.e., amount of PM trapped on the particulate filter) is likely to cause problems such as a reduction in engine power and an increase in fuel consumption. Therefore, when the PM trap amount is increased up to a given value, a particulate-filter regeneration process is performed to burn and remove the trapped PM from the particulate filter.

As one example of the particulate-filter regeneration process, there has been known a technique of providing an oxidation catalyst on an upstream side of the particulate filter in an exhaust-gas flow direction, and inducing a reaction between HC and CO components in exhaust gas and the oxidation catalyst so as to increase a temperature of the particulate filter by heat of combustion of the HC and CO components to burn PM trapped on the particulate filter.

A honeycomb-structured particulate filter is commonly known in which a plurality of inflow cells each extending in an exhaust-gas flow direction and having an open end on an upstream side in the exhaust-gas flow direction and a closed end on a downstream side in the exhaust-gas flow direction, and a plurality of outflow cells each extending in the exhaust-gas flow direction and having an open end on the downstream side in the exhaust-gas flow direction and a closed end on the upstream side in the exhaust-gas flow direction, are defined by a cell wall having fine communication pores for allowing exhaust gas to pass therethrough, in such a manner that the inflow cells and the outflow cells are arranged in a checkered pattern.

In the honeycomb-structured particulate filter, as well as a widely-used type designed to form each of the inflow cells for inflow of exhaust gas to have an opening area approximately equal to that of each of the outflow cells for outflow of exhaust gas, there has been known another type designed to form each of the inflow cells to have an opening area greater than that of each of the outflow cells (see, for example, Japanese Utility Model Laid-Open Publication No. 58-092409 and Japanese Patent Laid-Open Publication No. 2005-125209).

As compared with the first type of particulate filter designed to form each of the inflow cells to have an opening area approximately equal to that of each of the outflow cells, the second type of particulate filter designed to form each of the inflow cells to have an opening area greater than that of each of the outflow cells, as disclosed in the Japanese Utility Model Laid-Open Publication No. 58-092409 and the Japanese Patent Laid-Open Publication No. 2005-125209, can reduce a thickness of accumulated PM to suppress a pressure loss therein, under a condition that the same amount of PM is trapped by the two types of the particulate filters. This makes it possible to increase a time interval between the particulate-filter regeneration processes, and suppress the reduction in engine power and the increase in fuel consumption.

In addition to PM, ash comprising a glassy compound containing metal and phosphorus in engine oil is contained in exhaust gas discharged from the engine. While this ash is also trapped by a particulate filter provided in the exhaust passage, it will be continuously accumulated on the particulate filter without being burnt and removed even after being subjected to the particulate-filter regeneration process. Thus, the second type of particulate filter designed to form each of the inflow cells to have an opening area greater than that of each of the outflow cells is effective for reducing a thickness of accumulated ash to suppress a pressure loss therein.

SUMMARY OF THE INVENTION

Through various experiments and researches, the inventor of this application found that, during the particulate-filter regeneration process, the second type of particulate filter designed to form each of the inflow cells to have an opening area greater than that of each of the outflow cells exhibits a higher maximum temperature and a higher rate of temperature rise than those in the first type of particulate filter designed to form each of the inflow cells to have an opening area approximately equal to that of each of the outflow cells, as will be specifically described later.

Although the second type of particulate filter designed to form each of the inflow cells to have an opening area greater than that of each of the outflow cells is superior in pressure loss to the first type of particulate filter designed to form each of the inflow cells to have an opening area approximately equal to that of each of the outflow cells, as mentioned above, the second type of particulate filter is likely to become overheated due to the higher maximum temperature and the higher rate of temperature rise during the particulate-filter regeneration process, to cause melting or cracking therein.

Particularly, in cases where a particulate filter is provided in an exhaust passage of an engine to trap PM, PM will be trapped and accumulated in a central region in a larger amount than that in an outer peripheral region, in a cross-section of the particulate filter perpendicular to an exhaust-gas flow direction. Thus, the above phenomenon is more likely to occur in a central region of the second type of particulate filter.

In view of the above technical problem, it is a fundamental object of the present invention to prevent a particulate filter from becoming overheated in a central region thereof during a particulate-filter regenerating process, while suppressing a pressure loss in the particulate filter.

In order to achieve this object, in a first aspect of the present invention, there is provided a particulate filter which comprises: a filter body including a plurality of filter segments joined to each other by a joining material, wherein each of the filter segments includes a plurality of inflow cells each having a closed end on a downstream side in an exhaust-gas flow direction, a plurality of outflow cells each having a closed end on an upstream side in the exhaust-gas flow direction, and a cell wall having communication pores for passage of exhaust gas and defining the inflow cells and the outflow cells; and an outer peripheral coating covering an outer peripheral surface of the filter body, wherein the filter segments include: a first filter segment located in a central region of the particulate filter and designed to form each of the inflow cells to have an opening area approximately equal to that of each of the outflow cells; and a second filer segment located in at least a part of an outer peripheral region of the particulate filter and designed to form each of the inflow cells to have an opening area greater than that of each of the outflow cells.

In a second aspect of the present invention, in the particulate filter according to the first aspect of the present invention, a percentage occupied by the second filter segment designed to form each of the inflow cells to have an opening area greater than that of each of the outflow cells, in the particulate filter, is preferably set in the range of 25 to 70%.

In a third aspect of the present invention, in the particulate filter according to the first or second aspect of the present invention, the number of the second filter segments each designed to form each of the inflow cells to have an opening area greater than that of each of the outflow cells is two or more, wherein the two or more second filter segments are preferably arranged symmetrically with respect to a point defined by a center of the particulate filter.

In a fourth aspect of the present invention, the particulate filter according to the first or second aspect of the present invention preferably carries a catalyst material comprising: a composite oxide containing Ce and Zr; alumina; and Pt as a catalyst metal.

In the particulate filter according to the first aspect of the present invention, the first filter segment located in the central region of the particulate filter is designed to form each of the inflow cells to have an opening area approximately equal to that of each of the outflow cells, and the second filer segment located in at least a part of the outer peripheral region of the particulate filter is designed to form each of the inflow cells to have an opening area greater than that of each of the outflow cells. Thus, a pressure loss in the central region of the particulate filter is set at a slightly higher value than that in the outer peripheral region of the particulate filter, while suppressing an increase in total pressure loss, to facilitate flow of exhaust gas toward the outer peripheral region of the particulate filter, so that a difference between respective PM accumulation amounts (i.e., amounts of PM accumulated) in the outer peripheral region and the central region of the particulate filter can be reduced to keep the central region of the particulate filter from becoming overheated during a particulate-filter regeneration process. This makes it possible to prevent occurrence of melting or cracking in the particulate filter.

In the particulate filter according to the second aspect of the present invention, a percentage occupied by the second filter segment designed to form each of the inflow cells to have an opening area greater than that of each of the outflow cells, in the particulate filter, is preferably set in the range of 25 to 70%. This makes it possible to more reliably achieve the above effect.

In the particulate filter according to the third aspect of the present invention, when the number of the second filter segments each designed to form each of the inflow cells to have an opening area greater than that of each of the outflow cells is two or more, the second filter segments are preferably arranged symmetrically with respect to a point defined by the center of the particulate filter. This allows particulates to be trapped in a balanced manner with respect to the center of the particulate filter so as to more effectively achieve the above effect.

The particulate filter according to the fourth aspect of the present invention preferably carries a catalyst material comprising a composite oxide containing Ce and Zr, alumina, and Pt as a catalyst metal. This makes it possible to more reliably achieve the above effect.

DESCRIPTION OF THE PREFERRED EMBODIMENTS

With reference to the accompanying drawings, the present invention will now be described based on an embodiment thereof.

The inventor of this application firstly evaluated respective temperatures of two types of particulate filters: one type designed to form each of a plurality of inflow cells to have an opening area greater than that of each of a plurality of outflow cells, and the other type designed to form each of a plurality of inflow cells to have an opening area equal to that of each of a plurality of outflow cells.

Specifically, an experimental test was carried out by accumulating carbon on the particulate filter to burn the carbon accumulated on the particulate filter, and measuring a temperature of the particulate filter during the carbon burning, so as to simulate a temperature of a particulate filter during a particulate-filter regeneration process.

Figure 9:
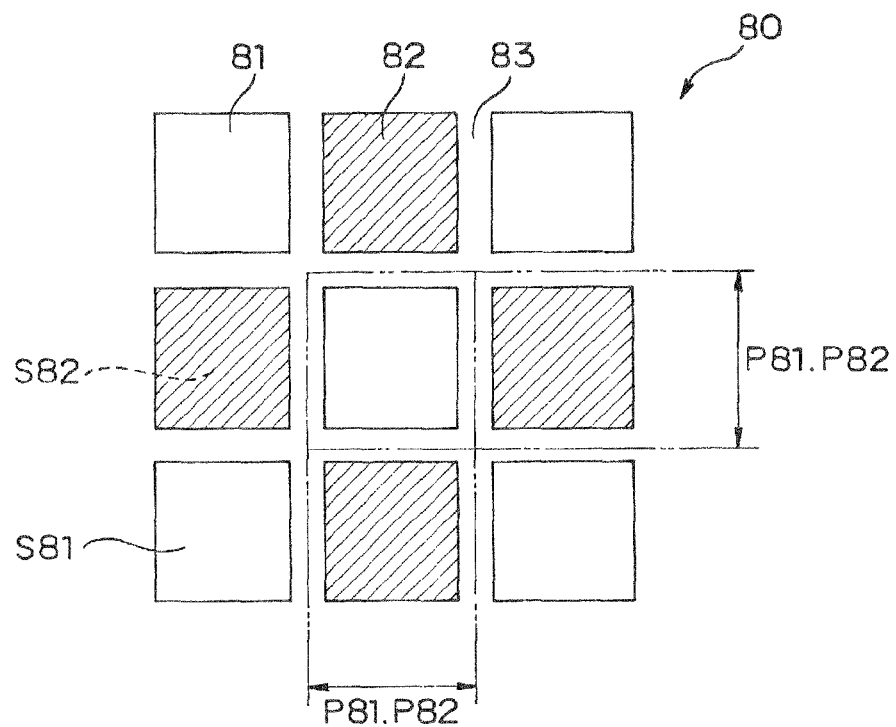
FIG. 9 is an explanatory front view schematically showing a part of a particulate filter designed to form each of a plurality of inflow cells to have an opening area equal to that of each of a plurality of outflow cells.
Figure 10:
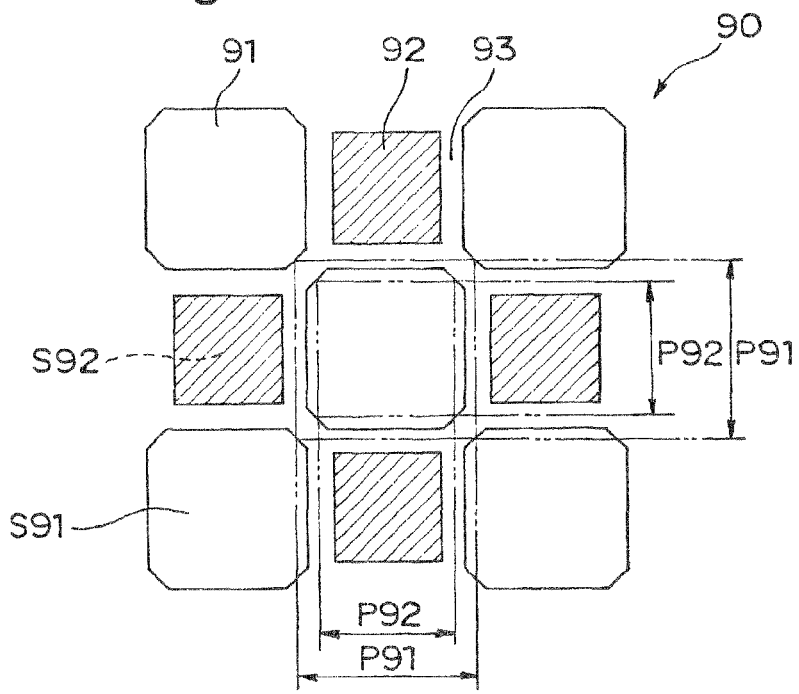
FIG. 10 is an explanatory front view schematically showing a part of a particulate filter designed to form each of a plurality of inflow cells to have an opening area greater than that of each of a plurality of outflow cells.

The two types of particulate filters used in the test are illustrated in FIGS. 9 and 10, wherein FIG. 9 is an explanatory front view schematically showing a part of a particulate filter designed to form each of a plurality of inflow cells to have an opening area equal to that of each of a plurality of outflow cells, and FIG. 10 is an explanatory front view schematically showing a part of a particulate filter designed to form each of a plurality of inflow cells to have an opening area greater than that of each of a plurality of outflow cells.

As shown in FIG. 9, a particulate filter 80 was used as the particulate filter designed to form each of a plurality of inflow cells to have an opening area equal to that of each of a plurality of outflow cells. The particulate filter 80 comprises: a plurality of inflow cells 81 each having an open end on an exhaust-gas inflow side of the particulate filter 80 and a closed end on an exhaust-gas outflow side of the particulate filter 80; a plurality of outflow cells 82 each having an open end on the exhaust-gas outflow side and a closed end on the exhaust-gas inflow side; and a cell wall 83 having communication pores (not shown) for passage of exhaust gas and defining each of the inflow cells 81 and the outflow cells 82 in a square shape in section, wherein the inflow cells 81 and the outflow cells 82 are arranged in a checkered pattern.

In the particulate filter 80, each of the inflow cells 81 and the outflow cells 82 extends in parallel relation to each other along an exhaust-gas flow direction. Further, a ratio of a cell pitch P81 of the inflow cells 81 to a cell pitch P82 of the outflow cells 82 is set at 1 (P81/P82=1), and the open end of each of the inflow cells 81 on the exhaust-gas inflow side is formed to have an opening area S81 equal to an opening area S82 of the open end of each of the outflow cells 82 on the exhaust-gas outflow side.

As shown in FIG. 10, a particulate filter 90 was used as the particulate filter designed to form each of a plurality of inflow cells to have an opening area greater than that of each of a plurality of outflow cells. The particulate filter 90 comprises: a plurality of inflow cells 91 each having an open end on an exhaust-gas inflow side of the particulate filter 90 and a closed end on an exhaust-gas outflow side of the particulate filter 90; a plurality of outflow cells 92 each having an open end on the exhaust-gas outflow side and a closed end on the exhaust-gas inflow side; and a cell wall 93 having communication pores (not shown) for passage of exhaust gas and defining each of the inflow cells 91 and the outflow cells 92 in a generally square shape in section, wherein the inflow cells 91 and the outflow cells 92 are arranged generally in a checkered pattern.

In the particulate filter 90, each of the inflow cells 91 and the outflow cells 92 extends in parallel relation to each other along an exhaust-gas flow direction. Further, a ratio of a cell pitch P91 of the inflow cells 91 to a cell pitch P92 of the outflow cells 92 is set at 1.3 (P91/P92=1.3), and the open end of each of the inflow cells 91 is formed to have an opening area S91 greater than an opening area S92 of the open end of each of the outflow cells 92 on the exhaust-gas outflow side.

Further, a catalyst material was carried on the particulate filter (80, 90) to promote burning of PM, in the following manner. Pt as a catalyst metal was carried on a powder prepared by mixing a Ce—Zr composite oxide (Zr=30 mol %) and a high specific surface area alumina added with 5 wt % of lanthanum (La), at a mixing ratio (mass ratio) of 3:1, to form a catalyst. Then, the catalyst was mixed with water and a binder to form a slurry, and the particulate filter (80, 90) was wash-coated with the slurry by sucking the slurry through the particulate filter (80, 90), and blowing air into the particulate filter (80, 90) to remove an excess part of the slurry. Then, the particulate filter (80, 90) was dried, and fired at a temperature of 500° C. for 2 hours.

The catalyst metal Pt was carried in an amount of 10 wt % with respect to a total mass of the Ce—Zr composite oxide and the high specific surface area alumina. An amount of the Ce—Zr composite oxide was set at 5 g/L (5 g per L of the particulate filter), and an amount of the high specific surface area alumina was set at 15 g/L (15 g per L of the particulate filter). The particulate filter (80, 90) had a diameter of 17 mm, a volume of 11 cc, a cell density of 300 cells/inch$^2$ (about 6.45 cm$^2$), and a cell-defining wall thickness of 12 mil (about 0.3 mm).

Then, carbon black as a substitute for PM was uniformly accumulated on the particulate filter (80, 90) carrying the catalyst material, in an amount of 7.5 g/L (7.5 g per L of the particulate filter), and a temperature of the particulate filter (80, 90) during a particulate-filter regeneration process was simulated to measure a temperature of the particulate filter (80, 90) during burning of carbon.

In an operation of measuring a temperature of the particulate filter (80, 90) during burning of carbon, the particulate filter (80, 90) having carbon accumulated thereon was inserted into a cylindrical-shaped silica tube placed within an electric furnace, and thermocouples were installed at respective centers of inlet and outlet ends of the particulate filter (80, 90). Then, evaluation gas was introduced from one end of the silica tube to burn the carbon, and a temperature of the particulate filter (80, 90) during the carbon burning was measured. In order to simulate use conditions in an actual engine, the particulate filter (80, 90) was placed within the electric furnace in such a manner that the outlet end of the particulate filter (80, 90) is located adjacent to an end of the electric furnace, and the center of the outlet end has a temperature of 570° C. when the center of the inlet end has a temperature of 640° C., as will be described below.

In this test, $N_2$ gas was supplied at a spatial velocity of 37,000/h, and heated by the electric furnace until a temperature of the particulate filter (80, 90) measured by the thermocouple installed at the center of the inlet end of the particulate filter (80, 90) was increased up to 640° C. Then, when the temperature of the particulate filter (80, 90) measured by the thermocouple installed at the center of the inlet end of the particulate filter (80, 90) was increased up to 640° C., $O_2$ gas was introduced into the $N_2$ gas to allow the carbon accumulated on the particulate filter (80, 90) to be burnt by the $N_2/O_2$ mixed gas ($N_2$: $O_2$=80:20 (volume ratio)). Along with the carbon burning, the temperature of the particulate filter (80, 90) will be gradually increased. The temperature of the particulate filter (80, 90) after the introduction of the $O_2$ gas was measured by the thermocouple installed at the center of the outlet end of the particulate filter (80, 90) in a time-series manner.

Figure 11:
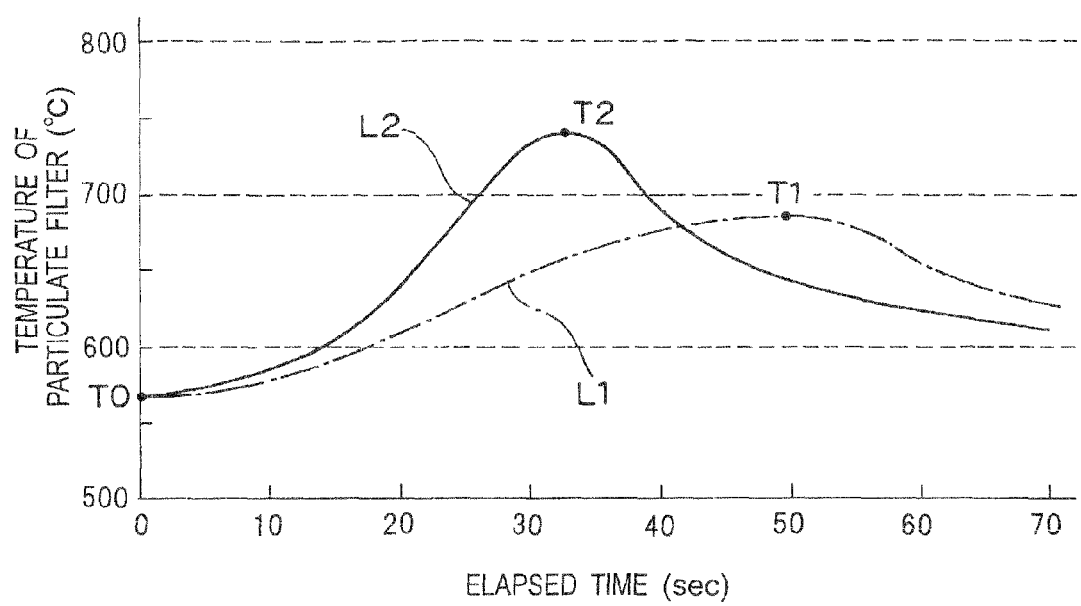
FIG. 11 is a graph showing a result of measurement on a temperature of a particulate filter during burning of carbon.

FIG. 11 is a graph showing a result of the measurement on the temperature at the center of the outlet end of the particulate filter (80, 90) during the carbon burning. In FIG. 11, the horizontal axis represents an elapsed time from the introduction of the $O_2$ gas, and the vertical axis represents the temperature at the center of the outlet end of the particulate filter (80, 90). A temperature curve L1 during the carbon burning, at the center of the outlet end of the particulate filter 80 designed to form each of the inflow cells 81 to have an opening area equal to that of each of the outflow cells 82, is indicated by the one-dot chain line, and a temperature curve L2 during the carbon burning, at the center of the outlet end of the particulate filter 90 designed to form each of the inflow cells 91 to have an opening area greater than that of each of the outflow cells 92, is indicated by the solid line.

As seen in FIG. 11, in the particulate filter 80 designed to form each of the inflow cells 81 to have an opening area equal to that of each of the outflow cells 82, the burning of carbon accumulated on the particulate filter 80 is initiated when the center of the outlet end of particulate filter 80 has a temperature T0 of about 570° C. Along with the carbon burning, the temperature at the center of the outlet end of particulate filter 80 is gradually increased. After the center of the outlet end of particulate filter 80 has a maximum temperature T1 of about 685° C., the temperature at the center of the outlet end of particulate filter 80 is gradually reduced.

In the particulate filter 90 designed to form each of the inflow cells 91 to have an opening area greater than that of each of the outflow cells 92, a temperature of the particulate filter 90 during the carbon burning is increased at a rise rate higher than that in the particulate filter 80 designed to form each of the inflow cells 81 to have an opening area equal to that of each of the outflow cells 82. Moreover, a maximum temperature T2 of the particulate filter 90 during the carbon burning is about 740° C. which is higher than the maximum temperature T1 in the particulate filter 80 designed to form each of the inflow cells 81 to have an opening area equal to that of each of the outflow cells 82.

From the above results, the inventor found out that, the particulate filter 90 designed to form each of the inflow cells 91 to have an opening area greater than that of each of the outflow cells 92 exhibits a higher maximum temperature and a higher rate of temperature rise than those in the particulate filter 80 designed to form each of the inflow cells 81 to have an opening area, equal to that of each of the outflow cells 82.

Although the particulate filter 90 designed to form each of the inflow cells 91 to have an opening area greater than that of each of the outflow cells 92 may be disposed in an exhaust passage of an engine to suppress a pressure loss in the particulate filter 90 as compared with the particulate filter 80 designed to form each of the inflow cells 81 to have an opening area equal to that of each of the outflow cells 82, it has a higher maximum temperature and a higher rate of temperature rise during a particulate-filter regeneration process, and thereby a central region of the particulate filter 90 having a larger PM accumulation amount is likely to become overheated. With a view to avoiding this problem, a particulate filter according to one embodiment of the present invention is configured such that, in a central region of the particulate filter, each of the inflow cells is formed to have an opening area approximately equal to that of each of the outflow cells, and, in at least a part of an outer peripheral region of the particulate filter, each of the inflow cells is formed to have an opening area greater than that of each of the outflow cells.

With reference to FIGS. 1 to 8, the particulate filter according to this embodiment will be specifically described below.

Figure 1:
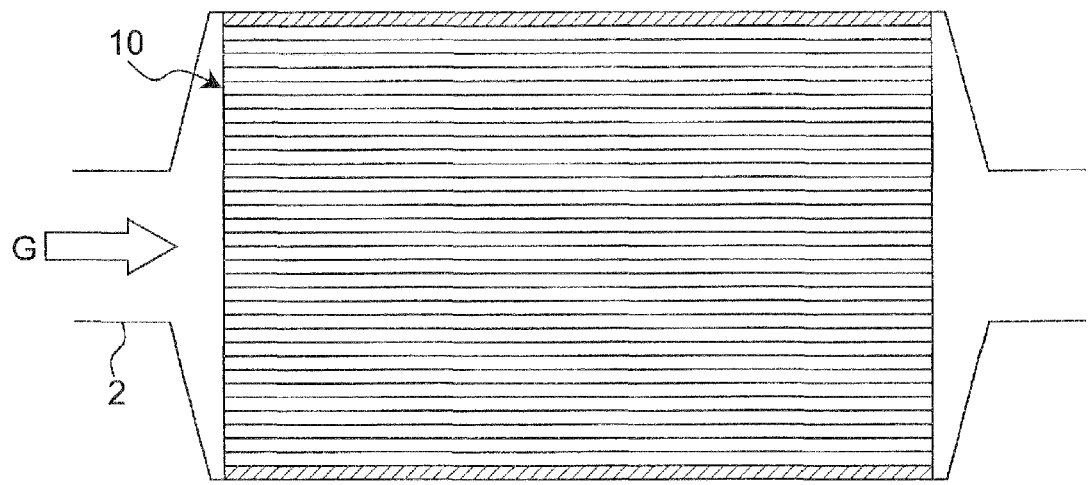
FIG. 1 is an explanatory diagram showing a particulate filter according to one embodiment of the present invention in a state after being assembled to an exhaust passage of an engine.

FIG. 1 is an explanatory diagram showing the particulate filter according to this embodiment in a state after being assembled to an exhaust passage of an engine. The particulate filter 10 is intended to trap PM, such as soot, contained in exhaust gas G discharged from an engine (not shown), such as a diesel engine. As shown in FIG. 1, the particulate filter 10 is interposed in an exhaust passage 2 of the engine, specifically in an enlarged portion of the exhaust passage 2.

Figure 2:
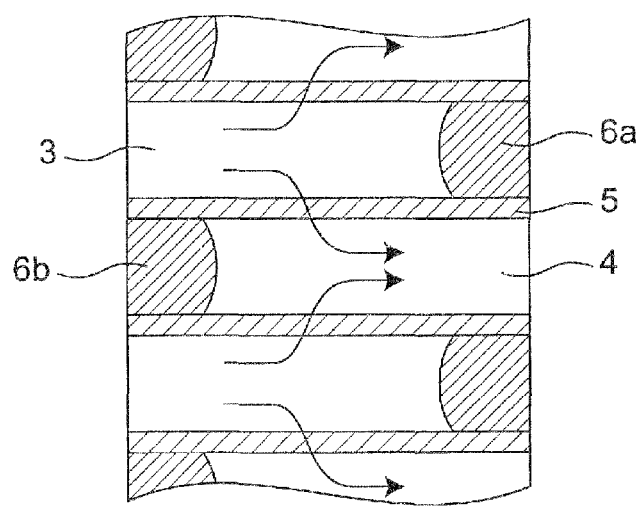
FIG. 2 is an explanatory sectional view schematically showing a part of the particulate filter.

FIG. 2 is an explanatory sectional view schematically showing a part of the particulate filter 10. As shown in FIG. 2, the particulate filter 10 is a so-called wall-flow type particulate filter which comprises a large number of inflow cells 3 extending in parallel relation to each other along a flow direction of the exhaust gas G, a large number of outflow cells 4 extending in parallel relation to each other along the flow direction of the exhaust gas G, and a cell wall 5 having communication pores (not shown) for allowing the exhaust gas G to pass therethrough and defining the inflow cells 3 and the outflow cells 4. The particulate filter 10 is made, for example, of silicon carbide (SiC), and formed in a honeycomb structure.

Each of the inflow cells 3 has an open end on an upstream side in the flow direction of the exhaust gas G, and a closed end on a downstream side in the flow direction of the exhaust gas G, wherein the closed end on the downstream side in the flow direction of the exhaust gas G is gas-tightly closed by a sealing member 6*a*. Each of the outflow cells 4 has an open end on the downstream side in the flow direction of the exhaust gas G1, and a closed end on the upstream side in the flow direction of the exhaust gas GA wherein the closed end on the upstream side in the flow direction of the exhaust gas G is gas-tightly closed by a sealing member 6*b*.

In the particulate filter 10, the exhaust gas G flowing in each of the inflow cells 3 from the open end thereof on the upstream side in the flow direction of the exhaust gas G is led to adjacent ones of the outflow cells 4 through the communication pores formed in the cell wall 5, and discharged from the open ends of the adjacent outflow cells 4 on the downstream side in the flow direction of the exhaust gas G During this process, PM, such as soot, contained in the exhaust gas, is trapped by the particulate filter 10.

Figure 3:
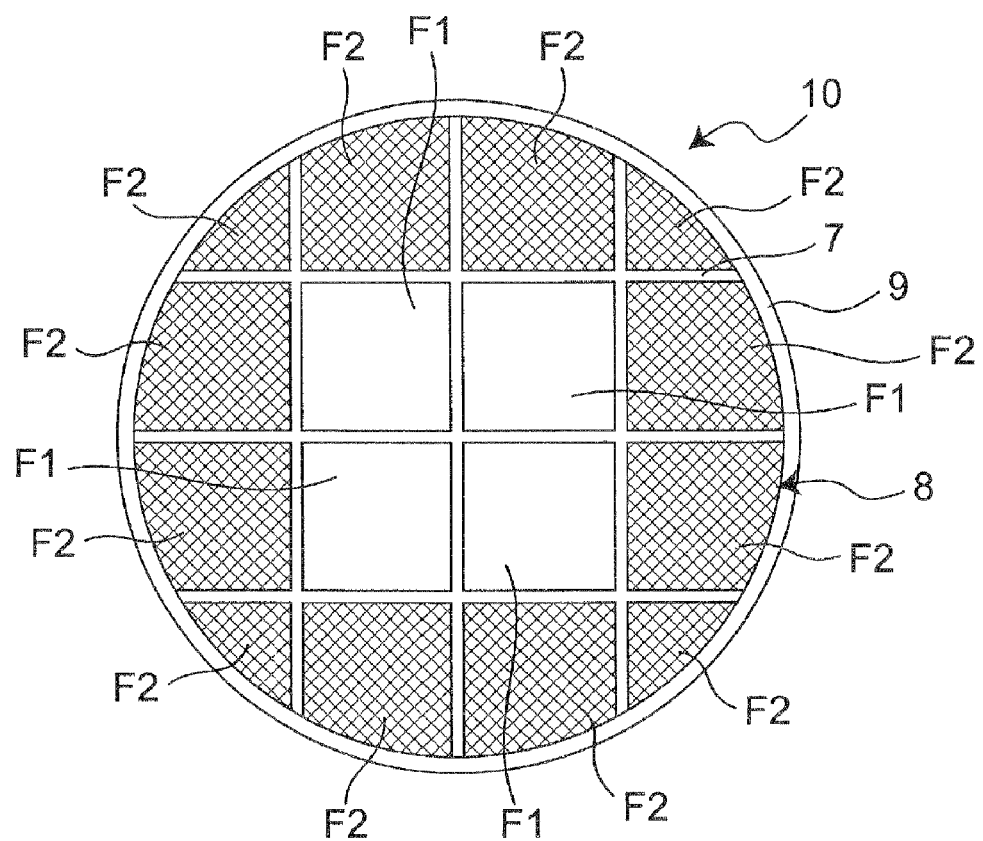
FIG. 3 is an explanatory front view schematically showing the particulate filter.
Figure 4:
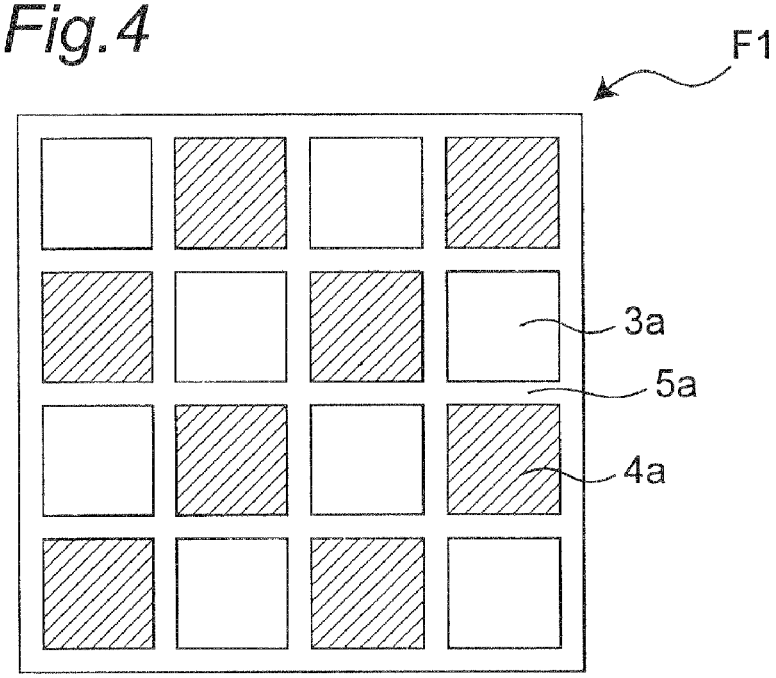
FIG. 4 is an explanatory front view schematically showing a filter segment designed to form each of a plurality of inflow cells to have an opening area equal to that of each of a plurality of outflow cells.
Figure 5:
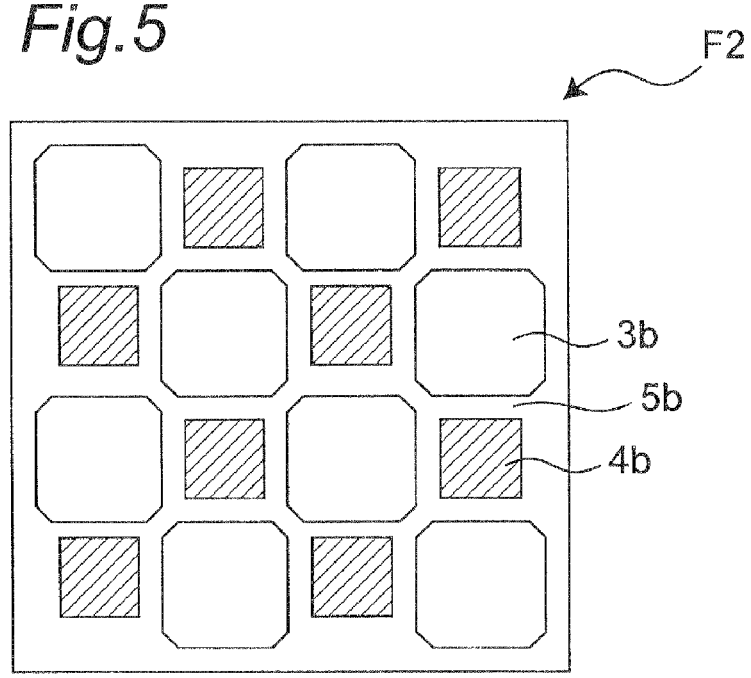
FIG. 5 is an explanatory front view schematically showing a filter segment designed to form each of a plurality of inflow cells to have an opening area greater than that of each of a plurality of outflow cells.

FIG. 3 is an explanatory front view schematically showing the particulate filter 10. FIG. 4 is an explanatory front view schematically showing a filter segment designed to form each of a plurality of inflow cells to have an opening area equal to that of each of a plurality of outflow cells, and FIG. 5 is an explanatory front view schematically showing a filter segment designed to form each of a plurality of inflow cells to have an opening area greater than that of each of a plurality of outflow cells. In FIG. 3, a joining material for joining a plurality of filter segments together is illustrated in an enlarged manner.

The particulate filter 10 comprises the large number of inflow cells 3 each having the closed end on the downstream side in the exhaust-gas flow direction, the large number of outflow cells 4 each having the closed end on the upstream side in the exhaust-gas flow direction, and the cell wall 5 defining the inflow cells 3 and the outflow cells 4, as mentioned above. In this embodiment, the particulate filter 10 is formed by joining together a plurality of filter segments F1, F2 each including a plurality of the inflow cells 3, a plurality of the outflow cells 4, and a part of the cell wall 5 defining the plurality of inflow cells 3 and the plurality of outflow cells 4.

More specifically, the particulate filter 10 is formed by joining together four filter segments (hereinafter referred to as "first filter segments") F1 arranged to extend in parallel to each other along the exhaust-gas flow direction and each designed to form each of the inflow cells to have an opening area equal to that of each of the Outflow cells, and twelve filter segments (hereinafter referred to as "second filter segments") F2 arranged to extend in parallel to each other along the exhaust-gas flow direction and each designed to form each of the inflow cells to have an opening area greater than that of each of the outflow cells.

As shown in FIG. 3, in the particulate filter 10, the four first filter segments F1 and twelve second filter segments F2 are joined to each other by a joining material 7 to make up a filter body 8, and an outer peripheral surface of the filter body 8 is covered by an outer peripheral coating 9. In a cross-section of the particulate filter 10 perpendicular to the exhaust-gas flow direction, each of the first filter segments F1 is located in a central region of the particulate filter 10, and each of the second filter segments F2 is located in an outer peripheral region of the particulate filter 10.

As shown in FIG. 4, each of the first filter segments F1 includes a plurality of inflow cells 3*a* extending in parallel relation to each other along the exhaust-gas flow direction, and a plurality of outflow cells 4*a* extending in parallel relation to each other along the exhaust-gas flow direction, and a cell wall 5*a* having communication pores (not shown) for allowing the exhaust gas G to pass therethrough and defining the inflow cells 3*a* and the outflow cells 4*a*, wherein each of the inflow cells 3*a* has an open end on the upstream side in the exhaust-gas flow direction and a closed end on the downstream side in the exhaust-gas flow direction, and each of the outflow cells 4*a* has an open end on the downstream side in the exhaust-gas flow direction and a closed end on the upstream side in the exhaust-gas flow direction, as with the particulate filter 80 illustrated in FIG. 9.

In each of the first filter segments F1, the inflow cells 3a and the outflow cells 4a are arranged in a checkered pattern. Further, a ratio of a cell pitch of the inflow cells 3a to a cell pitch of the outflow cells 4a is set at 1, and the open end of each of the inflow cells 3a on an exhaust-gas inflow side of the particulate filter 10 is formed to have an opening area equal to that of the open end of each of the outflow cells 4a on an exhaust-gas outflow side of the particulate filter 10. In each of the first filter segments F1, each of the inflow cells 3a and the outflow cells 4a is defined to have a square shape in section and is formed into a square prism shape.

As shown in FIG. 5, each of the second filter segments F2 includes a plurality of inflow cells 3b extending in parallel relation to each other along the exhaust-gas flow direction, and a plurality of outflow cells 4b extending in parallel relation to each other along the exhaust-gas flow direction, and a cell wall 5b having communication pores (not shown) for allowing the exhaust gas G to pass therethrough and defining the inflow cells 3b and the outflow cells 4b, wherein each of the inflow cells 3b has an open end on the upstream side in the exhaust-gas flow direction and a closed end on the downstream side in the exhaust-gas flow direction, and each of the outflow cells 4b has an open end on the downstream side in the exhaust-gas flow direction and a closed end on the upstream side in the exhaust-gas flow direction, as with the particulate filter 90 illustrated in FIG. 10.

In each of the second filter segments F2, the inflow cells 3b and the outflow cells 4b are arranged generally in a checkered pattern. Further, a ratio of a cell pitch of the inflow cells 3b to a cell pitch of the outflow cells 4b is set at 1.3, and the open end of each of the inflow cells 3b on the exhaust-gas inflow side is formed to have an opening area greater than that of the open end of each of the outflow cells 4b on the exhaust-gas outflow side. In each of the second filter segments F2, each of the inflow cells 3b and the outflow cells 4b is defined to generally have a square shape in section. Specifically, each of the inflow cells 3b is formed into an octagonal prism shape, and each of the outflow cells 4b is formed into a square prism shape. Further, the cell wall 5b is formed to have an approximately constant thickness.

The first filter segments FI and the second filter segments F2 are joined to each other by the joining material 7 to form the filter body 8. Then, the filter body 8 is machined into a columnar shape, i.e., the second filter segments F2 located in the outer peripheral region of the particulate filter 10 is machined. Then, the machined outer peripheral surface of the filter body 8 is covered by the outer peripheral coating 9, to prepare the particulate filter 10.

The outer peripheral coating 9 is made, for example, of ceramic fibers, and adapted to allow the filter body 8 formed by joining the first and second filter segments F1, F2 together to be fixedly held inside the exhaust passage 2, while releasing heat from the exhaust gas G therethrough.

Each of the second filter segments F2 designed to form each of the inflow cells 3b to have an opening area greater than that of each of the outflow cells 4b has a low pressure loss during accumulation of PM, as compared with each of the first filter segments F1 designed to form each of the inflow cells 3a to have an opening area equal to that of each of the outflow cells 4a. Thus, based on employing the second filter segments F2, a total pressure loss of the particulate filter 10 can be suppressed.

In the particulate filter 10, the second filter segments F2 are arranged around the entire outer peripheral region of the particulate filter 10. Alternatively, an appropriate number of the first filter segments F1 and an appropriate number of the second filter segments F2 may be arranged in the outer peripheral region of the particulate filter 10, i.e., an appropriate number of the second filter segments F2 may be arranged only in a part of the outer peripheral region of the particulate filter 10.

As above, in the particulate filter 10 according to this embodiment, each of the first filter segments located in the central region of the particulate filter 10 is designed to form each of the inflow cells to have an opening area equal to that of each of the outflow cells, and each of the second filter segments located in at least a part of the outer peripheral region of the particulate filter 10 is designed to form each of the inflow cells to have an opening area greater than that of each of the outflow cells. Thus, a pressure loss in the central region of the particulate filter 10 is set at a slightly higher value than that in the outer peripheral region of the particulate filter 10, while suppressing an increase in total pressure loss, to facilitate flow of exhaust gas toward the outer peripheral region of the particulate filter 10, so that a difference between respective PM accumulation amounts in the outer peripheral region and the central region of the particulate filter 10 can be reduced to keep the central region of the particulate filter 10 from becoming overheated during a particulate-filter regeneration process. This makes it possible to prevent occurrence of melting or cracking in the particulate filter 10.

In the particulate filter 10 according to this embodiment, where the first filter segment is arranged in the central region of the particulate filter 10, and the second filter segment is arranged in at least a part of the outer peripheral region of the particulate filter 10, a relationship between respective ones of a percentage occupied by the second filter segments F2 in the particulate filter 10, a temperature of the particulate filter 10 during burning of carbon, and a pressure loss in the particulate filter 10, was evaluated.

Specifically, in addition to the particulate filter 10 (Inventive Example 1) where the four first filter segments F1 are arranged in the central region of the particulate filter 10, and the twelve second filter segments F2 are arranged in the outer peripheral region of the particulate filter 10, wherein a percentage occupied by the second filter segments F2 in the particulate filter 10 is set at 67%, three types of particulate filters (Inventive Examples 2, 3, 4) were prepared in such a manner that a given number of first filter segments F1 are arranged in a central region of a particulate filter, and a given number of first filter segments F1 and a given number of second filter segments F2 are arranged in an outer peripheral region of the particulate filter, wherein a percentage occupied by the second filter segments F2 in the particulate filter is set at 29%, 40% and 57%, respectively. Then, a temperature of each of the particulate filters during burning of carbon, and a pressure loss in each of the particulate filters, were checked.

Figure 6A:
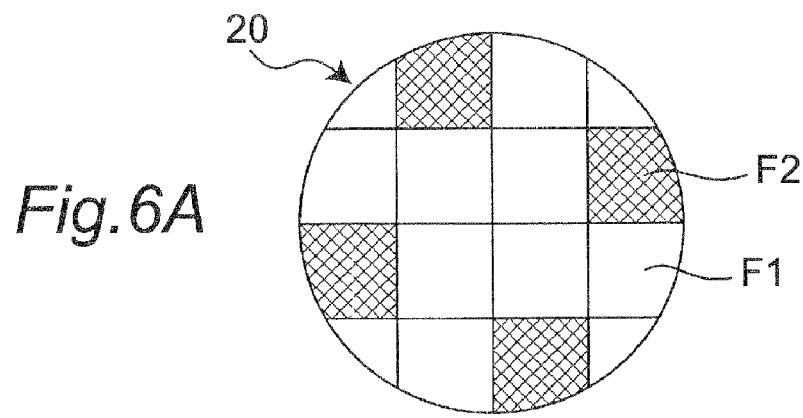
FIGS. 6A to 6C are explanatory front views schematically showing three types of particulate filters for use as Inventive Examples.
Figure 6B:
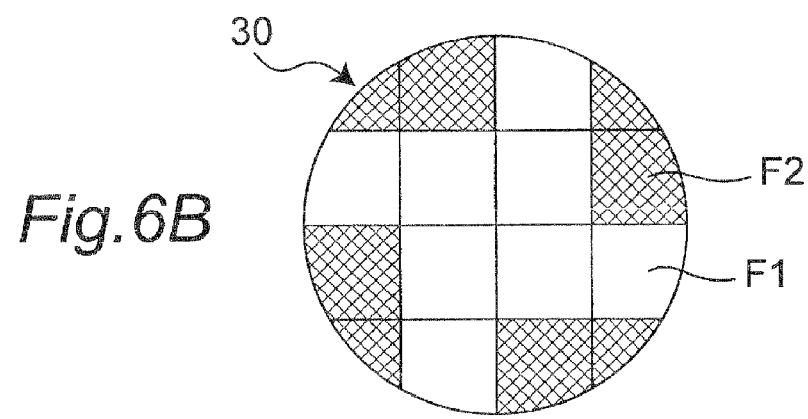
Figure 6C:
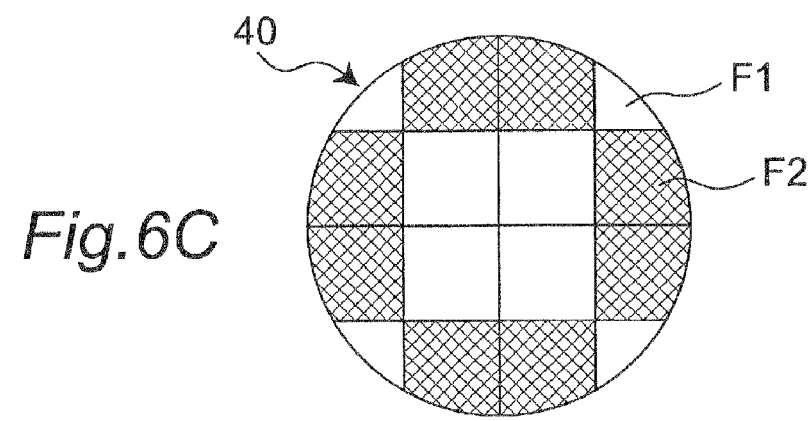

FIGS. 6A, 6B and 6C are explanatory front views schematically showing three types of particulate filters 20, 30, 40 for use as the Inventive Examples 2, 3, 4 wherein an a percentage occupied by second filter segments F2 is set at 29%, 40% and 57%, respectively.

More specifically, as shown in FIG. 6A, the particulate filter 20 for use as the Inventive Example 2 was prepared in such a manner that four first filter segments F1 are arranged in a central region of the particulate filter 20, and eight first filter segments F1 and four second filter segments F2 are arranged in an outer peripheral region of the particulate filter 20, wherein a percentage occupied by the second filter segments F2 in the particulate filter 20 is set at 29%. Further, as shown in FIG. 6B, the particulate filter 30 for use as the Inventive Example 3 was prepared in such a manner that four first filter segments F1 are arranged in a central region of the particulate filter 30, and four first filter segments F1 and eight second filter segments F2 are arranged in an outer peripheral region of the particulate filter 30, wherein a percentage occupied by the second filter segments F2 in the particulate filter 30 is set at 40%. As shown in FIG. 6C, the particulate filter 40 for use as the Inventive Example 4 was prepared in such a manner that four first filter segments F1 are arranged in a central region of the particulate filter 40, and four first filter segments F1 and eight second filter segments F2 are arranged in an outer peripheral region of the particulate filter 40, wherein a percentage occupied by the second filter segments F2 in the particulate filter 40 is set at 57%. The second filter segments F2 in each of the particulate filters 20, 30, 40 are arranged symmetrically with respect to a point defined by a center of each of the particulate filters 20, 30, 40, when viewed in the exhaust-gas flow direction, as shown in FIGS. 6A, 6B and 6C. Each of the particulate filters 20, 30, 40 and after-mentioned particular filters 50, 60 was prepared by joining sixteen filter segments together to form a filter body, and then machining the filter body into a columnar shape.

Further, a particulate filter (Comparative Example 1) was prepared in such a manner that only a given number of first filter segments F1 are arranged in a central region and an outer peripheral region of the particulate filter (i.e., a percentage occupied by second filter segments F2 is zero %), and a particulate filter (Comparative Example 2) was prepared in such a manner that only a given number of second filter segments F2 are arranged in a central region and an outer peripheral region of the particulate filter (i.e., a percentage occupied by the second filter segments F2 is 100%). Then, a temperature of each of the particulate filters during burning of carbon, and a pressure loss in each of the particulate filters, were checked.

Figure 7A:
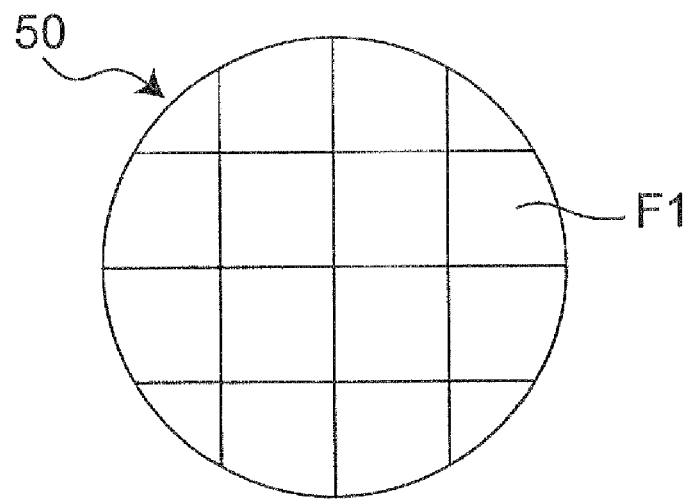
FIGS. 7A and 7B are explanatory front views schematically showing two types of particulate filters for use as Comparative Examples.
Figure 7B:
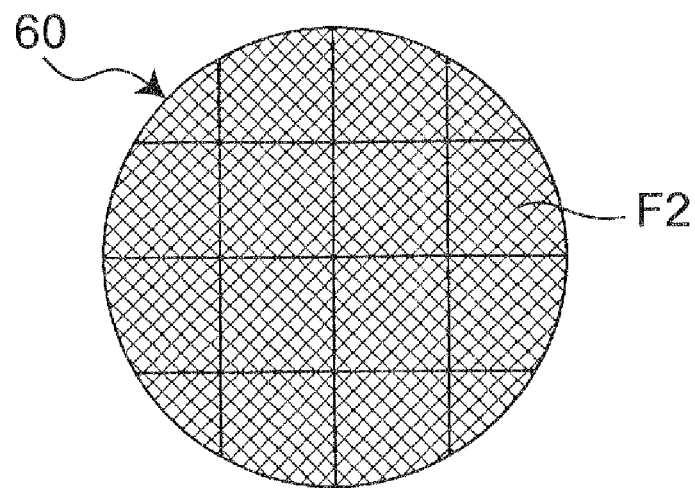

FIGS. 7A and 7B are explanatory front views schematically showing two types of particulate filters 50, 60 for use as the Comparative Examples 1, 2 wherein a percentage occupied by second filter segments F2 is zero % and 100%, respectively.

Specifically, as shown in FIG. 7A, the particulate filter 50 for use as the Comparative Example 1 was prepared in such a manner that sixteen first filter segments F1 are arranged in a central region and an outer peripheral region of the particulate filter 50 (i.e., a percentage occupied by second filter segments F2 is zero %). Further, as shown in FIG. 7B, the particulate filter 60 for use as the Comparative Example 2 was prepared in such a manner that sixteen second filter segments F2 are arranged in a central region and an outer peripheral region of the particulate filter 60 (i.e., a percentage occupied by the second filter segments F2 is 100%).

Then, a catalyst material was carried on each of the particulate filters 10, 20, 30, 40, 50, 60 to promote burning of PM, in the following manner. Pt as a catalyst metal was carried on a powder prepared by mixing a Ce—Zr composite oxide (Zr=30 mol %) carrying Pt as a catalyst metal, and a high specific surface area alumina added with 5 wt % of lanthanum (La), at a mixing ratio (mass ratio) of 3:1, to form a catalyst. Then, the catalyst was mixed with water and a binder to form a slurry, and the particulate filter was wash-coated with the slurry by sucking the slurry through the particulate filter, and blowing air into the particulate filter to remove an excess part of the slurry. Then, the particulate filter was dried, and fired at a temperature of 500° C. for 2 hours.

The catalyst metal Pt was carried in an amount of 5 wt % with respect to a total mass of the Ce—Zr composite oxide and the high specific surface area alumina. An amount of the Ce—Zr composite oxide was set at 5 g/L (5 g per L of the particulate filter), and an amount of the high specific surface area alumina was set at 15 g/L (15 g per L of the particulate filter). Each of the particulate filters 10, 20, 330, 40, 50, 60 had a cell density of 300 cells/inch$^2$ (about 6.45 cm$^2$), a cell-defining wall thickness of 12 mil (about 0.3 mm), a diameter of 143 mm, a length of 152.4 mm, and a volume of 2.5 L.

Then, the particulate filter (10, 20, 30, 40, 50, 60) carrying the catalyst material comprising the composite oxide containing Ce and Zr, alumina, and Pt as a catalyst metal, was disposed in an exhaust passage 2 of an actual engine. Then, PM was accumulated on the particulate filter in an amount of 7.5 g/L (7.5 g per L of the particulate filter), and a temperature of the particulate filter during a particulate-filter regeneration process and a pressure loss in the particulate filter was measured.

In an operation of measuring a temperature of the particulate filter (10, 20, 30, 40, 50, 60) during the particulate-filter regeneration process, sixteen thermocouples were inserted from respective ends of the sixteen filter segments on the downstream side in the exhaust gas flow direction, to positions each spaced apart by 1 cm from the downstream end in the upstream direction, and a highest one of respective temperatures of the sixteen filter segments measured by the thermocouples was determined as the temperature of the particulate filter during the particulate-filter regeneration process.

The particulate-filter regeneration process was performed by providing an oxidation catalyst in the exhaust passage 2 of the engine at a position on the upstream side of the particulate filter (10, 20, 30, 40, 50, 60), performing a post-injection to increase HC components contained in exhaust, occurring combustion of the HC components in the oxidation catalyst, and burning PM accumulated in the particulate filter, based on heat by the combustion of the HC components.

In an operation of measuring a pressure loss in the particulate filter (10, 20, 30, 40, 50, 60), two pressure meters were disposed, respectively, on upstream and downstream sides of the particulate filter, and a pressure loss in the particulate filter was determined from a pressure difference between upstream and downstream pressures measured by the pressure meters.

Figure 8:
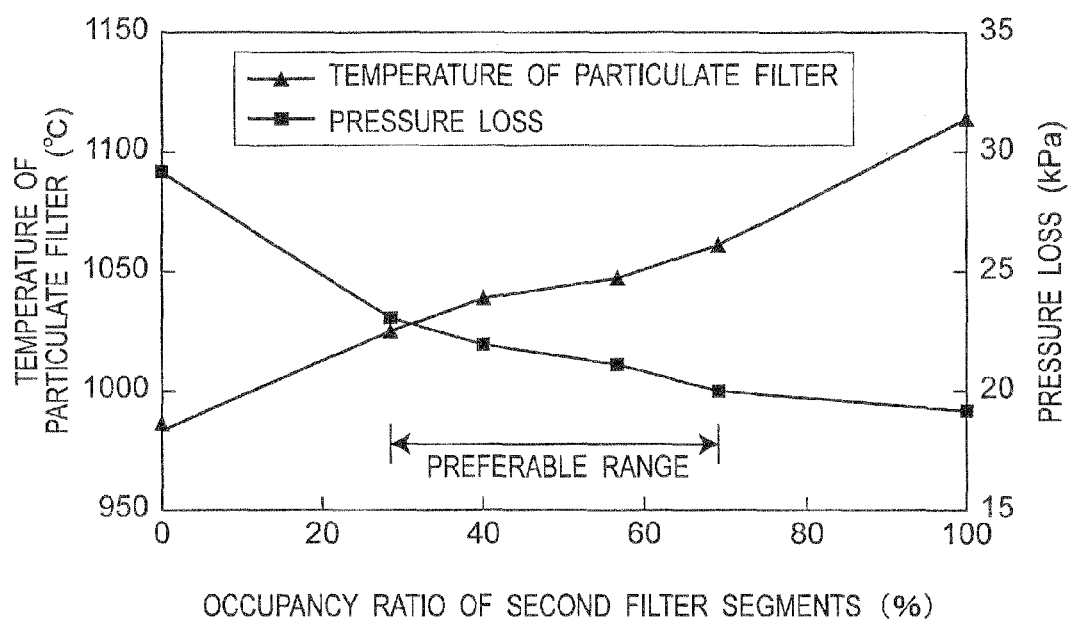
FIG. 8 is a graph showing a result of measurement on a temperature of a particulate filter during a particulate-filter regeneration process, and a pressure loss in the particulate filter.

FIG. 8 is a graph showing a result of the measurement on a temperature of the particulate filter and a pressure loss in the particulate filter, during the particulate-filter regeneration process, wherein the horizontal axis represents a percentage occupied by the second filter segments F2 in the particulate filter (occupancy ratio of the second filter segments), and the left vertical axis and the right vertical axis represent a temperature of the particulate filter during the particulate-filter regeneration process (i.e., a temperature at the position spaced apart by 1 cm from the downstream end in the upstream direction) and a pressure loss in the particulate filter, respectively.

As seen in FIG. 8, as for a temperature of the particulate filter during the particulate-filter regeneration process, each of the particulate filters 10, 20, 30, 40 (Inventive Examples 1, 2, 3, 4) having the second filter segments F2 arranged in the outer peripheral region of the particulate filter, exhibits a lower value than that in the particulate filter 50 (Comparative Example 1) where a percentage occupied by second filter segments F2 is zero %, and the temperature of the particulate filter during the particulate-filter regeneration process becomes lower along with an increase in the percentage occupied by the second filter segments F2. In the particulate filter 60 (Comparative Example 2) where a percentage occupied by the second filter segments F2 is 100%, the temperature of the particulate filter during the particulate-filter regeneration process is further reduced. In any of the Inventive Examples and Comparative Examples, a highest temperature was detected from one of the four filter segments arranged in the central region.

Thus, as compared with the particulate filter 50 consisting only of the first filter segments each designed to form each of the inflow cells to have an opening area equal to that of each of the outflow cells, a temperature of a particulate filter during the particulate-filter regeneration process can be reduced by arranging the first filter segment designed to form each of the inflow cells to have an opening area equal to that of each of the outflow cells, and the second filter segment designed to form each of the inflow cells to have an opening area greater than that of each of the outflow cells, respectively, in a central region and an outer peripheral region of the particulate filter.

Further, when the first filter segment designed to form each of the inflow cells to have an opening area equal to that of each of the outflow cells, and the second filter segment designed to form each of the inflow cells to have an opening area greater than that of each of the outflow cells, are arranged, respectively, in a central region and an outer peripheral region of a particulate filter, the second filter segment designed to form each of the inflow cells to have an opening area greater than that of each of the outflow cells is arranged in the outer peripheral region of the particulate filter which has relatively high coolability. This makes it possible to keep the particulate filter from becoming overheated during the particulate-filter regeneration process.

As for a pressure loss in a particulate filter, each of the particulate filters 10, 20, 30, 40 (Inventive Examples 1, 2, 3, 4) having the first filter segments F1 arranged in the central region of the particulate filter and the second filter segments F2 arranged in the outer peripheral region of the particulate filter has a lower value than that in the particulate filter 60 (Comparative Example 2) where a percentage occupied by the second filter segments F2 is 100%, and the pressure loss in the particulate filter becomes lower along with a decrease in the percentage occupied by the second filter segments F2. In the particulate filter (Comparative Example 1) where a percentage of occupied by the second filter segments F2 is zero %, the pressure loss in the particulate filter is further reduced.

Thus, as compared with the particulate filter 60 consisting only of the second filter segments each designed to form each of the inflow cells to have an opening area greater than that of each of the outflow cells, a pressure loss of a particulate filter can be reduced by arranging the first filter segment designed to form each of the inflow cells to have an opening area equal to that of each of the outflow cells, and the second filter segment designed to form each of the inflow cells to have an opening area greater than that of each of the outflow cells, respectively, in a central region and an outer peripheral region of the particulate filter.

Further, when the first filter segment designed to form each of the inflow cells to have an opening area equal to that of each of the outflow cells, and the second filter segment designed to form each of the inflow cells to have an opening area greater than that of each of the outflow cells, are arranged, respectively, in a central region and an outer peripheral region of a particulate filter, a pressure loss in the central region of the particulate filter can be set at a value slightly greater than that in the outer peripheral region of the particulate filter, so that a PM trap amount can be equalized in the central region and the outer peripheral region of the particulate filter.

In view of the above result, a percentage occupied by a second filter segment suitable for keeping a particulate filter from becoming overheated while suppressing a pressure loss in the particulate filter is preferably set in the range of 25 to 70%.

As above, in the particulate filter according to the above embodiment, each of the first filter segments located in a central region of the particulate filter is designed to form each of the inflow cells to have an opening area approximately equal to that of each of the outflow cells, and each of the second filer segments located in at least a part of an outer peripheral region of the particulate filter is designed to form each of the inflow cells to have an opening area greater than that of each of the outflow cells. This makes it possible to keep the central region of the particulate filter from becoming overheated during the particulate-filter regeneration process, while suppressing a total pressure loss.

Further the second filer segments each designed to form each of the inflow cells to have an opening area greater than that of each of the outflow cells are arranged symmetrically with respect to a point defined by a center of the particulate filter. This allows particulates to be trapped in a balanced manner with respect to the center of the particulate filter so as to more effectively achieve the above effect.

The particulate filter preferably carries a catalyst material comprising a composite oxide containing Ce and Zr, alumina, and Pt as a catalyst metal. This makes it possible to more reliably achieve the above effect.

In each of the second filter segments F2 of the particulate filter 10, each of the inflow cells 3b is formed into an octagonal prism shape, and each of the outflow cells 4b is formed into a square prism shape. Alternatively, as long as the second filter segments can be designed to form each of the inflow cells to have an opening area greater than that of each of the outflow cells, each of the inflow cell 3b and the outflow cell 4b may be formed in any other suitable shape, such as a cylindrical shape.

The present invention is directed to a particulate filter for trapping particulates contained in exhaust gas, and suitably applied to an exhaust system of a vehicle equipped, for example, with a lean-burn gasoline engine or a diesel engine.

It is understood that the present invention is not limited to the illustrated embodiment, but various modifications and changes in design may be made therein without departing from the spirit and scope of the present invention.

What is claimed is:

1. A particulate filter comprising:
   a filter body including a plurality of filter segments joined to each other by a joining material, each of the filter segments including a plurality of inflow cells each having a closed end on a downstream side in an exhaust-gas flow direction, a plurality of outflow cells each having a closed end on an upstream side in the exhaust-gas flow direction, and a cell wall having communication pores for passage of exhaust gas and defining the inflow cells and the outflow cells; and
   an outer peripheral coating covering an outer peripheral surface of the filter body,
   wherein the filter segments include: a first filter segment located in a central region of the particulate filter and designed to form each of the inflow cells to have an opening area approximately equal to that of each of the outflow cells; and a second filer segment located in at least a part of an outer peripheral region of the particulate filter and designed to form each of the inflow cells to have an opening area greater than that of each of the outflow cells.

2. The particulate filter as defined in claim 1, wherein a percentage occupied by the second filter segment designed to form each of the inflow cells to have an opening area greater than that of each of the outflow cells, in the particulate filter, is in the range of 25 to 70%.

3. The particulate filter as defined in claim 1, wherein the number of the second filter segments each designed to form each of the inflow cells to have an opening area greater than that of each of the outflow cells is two or more, wherein the second filter segments are arranged symmetrically with respect to a point defined by a center of the particulate filter.

4. The particulate filter as defined in claim 1 which carries a catalyst material comprising: a composite oxide containing Ce and Zr, alumina, and Pt as a catalyst metal.

5. The particulate filter as defined in claim 2, wherein the number of the second filter segments each designed to form each of the inflow cells to have an opening area greater than that of each of the outflow cells is two or more, wherein the second filter segments are arranged symmetrically with respect to a point defined by a center of the particulate filter.

6. The particulate filter as defined in claim 2, which carries a catalyst material comprising: a composite oxide containing Ce and Zr; alumina; and Pt as a catalyst metal.

* * * * *